United States Patent [19]
Taylor et al.

[11] Patent Number: 5,000,835
[45] Date of Patent: Mar. 19, 1991

[54] METHOD OF REDUCING $H_2S$ IN ASPHALT

[75] Inventors: Stephen M. Taylor, Godalming; John P. Gorman, New Milton, both of United Kingdom

[73] Assignee: Exxon Chemical Patents, Inc., Linden, N.J.

[21] Appl. No.: 416,051

[22] Filed: Oct. 2, 1989

[51] Int. Cl.$^5$ ............................................. C10G 1/00
[52] U.S. Cl. ................................. 208/39; 208/41; 208/47; 106/284.3; 106/273.1
[58] Field of Search .......................... 208/39, 41, 47; 106/284.3, 273.1

[56] References Cited

U.S. PATENT DOCUMENTS

| | | | |
|---|---|---|---|
| 3,868,263 | 2/1975 | McConnaughay | 106/283 |
| 4,248,749 | 2/1981 | Hayashi et al. | 106/281.1 |
| 4,801,332 | 1/1989 | Selbridge et al. | 106/281.1 |
| 4,877,457 | 10/1989 | Schelling et al. | 106/281.1 |

Primary Examiner—Helane E. Myers
Attorney, Agent, or Firm—R. L. Graham

[57] ABSTRACT

In a refinery operation for producing asphalt, a metal organic acid salt is used to reduce $H_2S$ caused by thermal decomposition of hydrocarbons in the asphalt.

10 Claims, No Drawings

METHOD OF REDUCING H₂S IN ASPHALT

FIELD OF THE INVENTION

This invention relates to the treatment of hot asphalt to reduce H$_2$S therein. In one aspect, the invention relates to the treatment of asphalt refinery residue to reduce H$_2$S therein prior to discharge to storage.

BACKGROUND OF THE INVENTION

Petroleum asphalt is produced as a residue of a thermal separation refinery process. The thermal separation process causes thermal cracking to occur which frequently causes hydrogen sulfide to be present in the asphalt stream. In fact, thermal cracking continues in the asphalt even after the asphalt has left the vacuum distillation section of the operation; particularly at high temperature. In order to permit the safe loading, handling, and storage of the asphalt, it is necessary to reduce the H$_2$S to safe levels in the asphalt. This has been done in the past by weathering of the hot asphalt for sufficient time for the H$_2$S to evolve. This not only takes a considerable amount of time (several days), but it releases H$_2$S to the vapor space in the storage which could create hazardous conditions. Moreover, recent emphasis on environmental regulations in Europe stresses the limits on the H$_2$S content of vent gas.

Other efforts to avoid these problems involve operating the vacuum distillation tower at a lower temperature to reduce thermal cracking in the residue. Lower temperature operation is achieved by increasing the flow of asphalt in a quench loop. This, however, is less efficient than operating at higher temperatures and decreases throughput and thermal recovery.

European Patent Specification, Publication No. 0121377 discloses the use of scavengers in treating bitumen/sulfur mixtures. The H$_2$S scavengers are used at temperatures between 130° C. and 170° C. to permit the mixing of sulfur and bitumen and to permit the safe handling of the mixture. Sulfur, in this application, is added to the bitumen to improve the end use properties of the bitumen. This publication does not relate to the production of asphalt or the treatment of freshly produced asphalt.

SUMMARY OF THE INVENTION

In accordance with the present invention, a metal salt of an organic acid is introduced into the effluent stream (residue) of asphalt produced by refinery operations at a temperature above 180° C., preferably above 190° C., and prior to the evolution of free H$_2$S. The metal organic acid salt is a salt of a carboxylic acid, preferably carboxylic salts of iron, zinc, copper, or zirconium, with the zinc and iron carboxylates being the most preferred. The organic acid salts react with the H$_2$S to form stable sulfides, thereby reducing free H$_2$S in the asphalt.

DESCRIPTION OF THE PREFERRED EMBODIMENTS

In petroleum asphalt produced by refining crude oil, the crude oil is passed through fractionators (e.g. vacuum distillation tower) which produce a variety of products including gasoline, diesel oil, fuel oils, etc. The asphalt bottoms or residue from the vacuum distillation is passed through at least one heat exchanger and discharged to storage and maintained in a heated condition (above 170° C.) to permit handling. A certain amount of H$_2$S is generally present in the bottoms because of thermal cracking of the feed crude. The H$_2$S generated is a function of temperature, the higher the bottom temperature, the more H$_2$S generated. Some feed crudes produce more H$_2$S than others, even at the same temperature.

In some operations, the vacuum distillation tower is operated at a lower temperature by recycling a portion of the cooled residue to the tower. This reduces the amount of H$_2$S produced from thermal cracking. However, as discussed above, it is more efficient to operate at higher residue temperatures—more energy is available for heating incoming crude in the heat exchanger and higher asphalt throughput is possible.

In accordance with the present invention, it has been discovered that by injecting certain oil soluble metal organic salts into the hot asphalt residue from the distillation unit prior to the asphalt residue reaching storage, the H$_2$S dissolved in the asphalt is converted to stable sulfides.

The salts of alkylarylcarboxylic acids or alkyl carboxylic acids having from 6 to 24, preferably 6 to 12 carbon atoms, may be used. The preferred organic salts are naphthenates carboxylates having from 6 to 12 carbon atoms. The preferred metals are zinc, iron, copper, zirconium, cobalt, nickel, and sodium, with zinc and iron being most preferred. The compounds that have exhibited good performance in laboratory experiments are copper, iron, zinc, and zirconium naphthanates and zinc octoate.

In order to disperse the metal organic salt in the asphalt, it is necessary to employ a diluent or solvent. The solvent should have a flash point above the temperature of use of the organic salt. A refined oil such as ESSO Petroleum's Stanco 90 or Stanco 600 has proven satisfactory. The concentration of the metal salt in the solvent may vary within a wide range. Concentrations in the range of 1 to 20%, preferably 1 to 10%, should be satisfactory for most operations.

In preferred operations, the metal organic salt is introduced in the residue effluent line of the refining operation prior to the asphalt reaching storage. The residue leaves the tower at above 300°, and is pumped through at least one heat exchanger (crude heater) and cooled to a temperature of 200° to 250° C. The pumping pressures is at about 2 to 6 bars. In a preferred operations, a second heat exchanger (water box cooler) in series with the first heat exchanger, further cools the asphalt to 180°-210° C. range. Upstream of the box cooler and downstream of the crude heater, a quench loop line interconnects the asphalt line to the distillation tower to permit recycling a portion of the cooled asphalt residue stream.

At the point of organic salt introduction, the H$_2$S should be dissolved in the asphalt (e.g. prior to gas evolution) and the temperature should be above 180° C., preferably above 190° C., and most preferably above 200 C. It is preferred that the metal organic salt be introduced at a location upstream of the last heat exchanger (box cooler). This pressure at this point will ensure no H$_2$S evolution, and allow sufficient agitation and time for the salt to disperse in the hot asphalt. The temperature at this location will normally be between about 200° and 250° C.

In operation, the metal organic salt in a suitable solvent will be introduced into the asphalt in a concentration wherein the presence of the metal ion is as follows: broadly 0.0005 to 1 wt. %, preferred range 0.005 to 0.5 wt.%, most preferred range 0.05 to 0.5 wt. % based on the weight of the asphalt composition including the organic salt. Generally, from 1 to 3 ppm of metal ion for each 3 ppm of $H_2S$ in the asphalt is sufficient. The treatment should be sufficient to reduce the residue $H_2S$ in the asphalt to between 2 and 50 ppm.

EXPERIMENTS

It is well known that hot asphalt evolves hydrogen sulfide and that as a result precautions have to be taken when large volumes of hot asphalt are being handled. There is, however, very little published information available on the effects of time and temperature on $H_2S$ evolution or on the comparative behavior of asphalt from various crude sources; nor is there a laboratory test that can be used to predict $H_2S$ levels that may be encountered during normal asphalt operations.

To fill this gap a simple laboratory test for measuring $H_2S$ evolution has been devised and the $H_2S$ evolution characteristics of several types of asphalt have been measured.

Test Method: The test entails heating a specified weight of asphalt in a sealed conical flask at the required test temperature for the required time, and then after cooling, the $H_2S$ concentration in the vapour space is measured by means of a Drager tube. Full details of the test method are described below.

Effect of Temperature: To determine the effect of temperatures on $H_2S$ evolution tests have been carried out on penetration grade asphalt from five different crude sources. The asphalt samples were tested after 2 hours storage at temperatures ranging from 130° C. -190° C.

The results obtained (in ppm $H_2S$) are given in Table I below:

TABLE I

| Test Temp °C. | CRUDE SOURCE | | | | |
|---|---|---|---|---|---|
| | A | B | C | D | E |
| 130 | 0 | — | 5 | — | 5 |
| 145 | 0 | 5 | 10 | — | 10 |
| 160 | 0 | 10 | 15 | 15 | 45 |
| 175 | 25 | 20 | 30 | 40 | 90 |
| 190 | 70 | 70 | 70 | 70 | 250 |

From these results it can be seen that with one exception (Crude E) asphalt from the crude sources under examination show very similar temperature/$H_2S$ characteristics. The increase in $H_2S$ with increased temperature is believed to be due in part to thermal cracking of the asphalt.

Effect of Time: Samples A and B were tested to determine the effect of time at a constant temperature (175° C.) on $H_2S$ evolution. The results are presented in Table II.

These tests demonstrate that weathering asphalts can produce unsafe levels in the storage vapor space because of the accumulation of $H_2S$.

TABLE II

| Effect of Time on $H_2S$ Evolution at 175° C. (ppm $H_2S$). | | |
|---|---|---|
| Time (hrs) | CRUDE A | CRUDE B |
| 1 | 10 | 55 |
| 2 | 25 | — |
| 3 | 30 | 60 |
| 6 | 40 | 40 |

Experiments were carried out to determine the effects of adding an organic salt in accordance with the present invention on the evolution of $H_2S$ from hot asphalt. The test procedure was as follows:

(a) a given amount of an organic salt is added to a 100 gram sample of asphalt contained in a 500 ml flask; insert drechsel head in flask and place in an oven maintained at 190° C;

(b) after 2 hours, remove flask from oven and allow to cool to below 60° C.;

(c) attach Drager tube to drechsel head;

(d) attach a separating funnel with known volume of mineral oil to drechsel head;

(e) displace vapor in flask with 200 ml mineral oil; vapor flows in Drager tube;

(f) read scale marking on Drager tube; and (g) calculate $H_2S$ in ppm: $100 \times$ Drager tube reading $\times 50$ The constants "100" and "50" are functions of the particular tube calibration range. Other $H_2S$ measurement methods are possible.

The following organic salts and solvents were used in the experiments.

| Organic Salt | | Solvent | |
|---|---|---|---|
| CN | Copper naphthanate | X | Toluene |
| IN | Iron naphthanate | Y | Aromatic solvent[1] |
| ZN | Zinc naphthanate | | Commercial grade |
| ZO | Zinc octoate | Z | Heavy Base[2] |
| ZrN | Zirconium Naphthanate | | Refined Oil |

[1]marketed by Exxon Chemical Company as Solvesso 150 (Flash Point 65.6° C.)
[2]marketed by Exxon Chemical Company as Stanco 90 (Flash Point 24° C.) or Stanco 600 (Flash Point 264° C.)

Experiments on $H_2S$ evolution using various asphalt samples were run with and without the metal organic salts. The test method was in accordance with the procedure described above. Table III presents the results.

TABLE III

| Test No. | Additive: Organic Salt/ Solvent | Wt % Metal In Additive | Wt % Additive In Asphalt | $H^2S$ (ppm) | |
|---|---|---|---|---|---|
| | | | | No Treatment | With Treatment |
| 1 | CN/Y | 2 | 0.5 | 1300 | 40 |
| 2 | IN/Y | 2 | 0.5 | 1300 | 15 |
| 3 | ZN/X | 9 | 0.5 | 1300 | 0 |
| 4 | IN/Z | 2 | 0.5 | 1300 | 22 |
| 5 | IN/Z | 2 | 0.1 | 1300 | 750 |
| 6 | ZN/X | 9 | 0.1 | 1300 | 0 |
| 7 | ZO/Z | 8 | 0.1 | 2000 | 420 |
| 8 | ZO/Z | 8 | 0.05 | 2000 | 1150 |
| 9 | ZO/Z | 8 | 0.01 | 2000 | 1750 |
| 10 | IN/Z | 8 | 0.10 | 1650 | 35 |
| 11 | IN/Z | 8 | 0.05 | 1650 | 190 |
| 12 | IN/Z | 8 | 0.01 | 1650 | 1250 |
| 13 | ZrN/Z | 2 | 0.5 | 1300 | 870 |

Based on the data of Table III, the preferred organic salts are iron and zinc naphthanates and octoates. These salts are oil soluble, readily available, and effective for purposes of this invention.

What is claimed is:

1. In a petroleum refining method for producing asphalt wherein asphalt is produced at a temperature above 300° C. and cooled to a temperature below 180° C., an improved method for reducing $H_2S$ evolution in the asphalt which comprises introducing an effective amount of an oil soluble metal carboxylic acid salt into the hot asphalt prior to cooling to 180° C. and prior to the evolution of any substantial amount of $H_2S$ to react with $H_2S$ in the asphalt.

2. The method of claim 1 wherein the refining method for producing asphalt includes a fractionator for discharging asphalt as a residue stream, and wherein the oil soluble metal carboxylic acid salt is introduced into the residue stream.

3. The method of claim 1 wherein the metal of the carboxylic salt is selected from the group consisting of Zn, Fe, Cu, and Zr.

4. The method of claim 1 wherein the metal carboxylic salt is selected from the group consisting of metal carboxylates having from 6 to 24 carbon atoms.

5. The method of claim 4 wherein the metal carboxylates are iron or zinc naphthanates and octoates.

6. The method of claim 1 wherein the carboxylic acid salts are dissolved in a solvent having a flash point above the temperature of introduction.

7. The method of claim 1 wherein the concentration of the carboxylic acid salt is sufficient to provide a metal content of from 0.0005 to 1 wt.% in the asphalt.

8. The method of claim 7 wherein the concentration of the carboxylic acid salt is sufficient to provide from 1 to 3 ppm of metal to 3 ppm of $H_2S$ in the asphalt.

9. In a thermal process for refining petroleum wherein the oil processed through a fractionator, the asphalt residue of which is passed through at lest one heat exchanger to cool the residue and to storage, the improvement for reducing $H_2S$ produced by thermal decomposition of hydrocarbons in the residue, the improvement comprising introducing a metal carboxylate into the residue stream downstream of the fractionator and upstream of the last heat exchanger wherein the temperature of the asphalt residue is above 180° C. and substantially all of the $H_2S$ is in solution, the amount of metal carboxylate introduced into the asphalt being sufficient to provide a metal content of between 0.005 to 0.5 wt % in the asphalt.

10. The method of claim 8 wherein the pressure of the asphalt residue at the point of introduction is at least 2 bars.

* * * * *